April 4, 1950 — D. A. ROSS — 2,503,133

PISTON RING

Filed March 15, 1945

INVENTOR:
D. A. ROSS
ATTORNEYS

Patented Apr. 4, 1950

2,503,133

UNITED STATES PATENT OFFICE 2,503,133

PISTON RING

Daniel A. Ross, Toronto, Ontario, Canada, assignor to McQuay-Norris Manufacturing Company, St. Louis, Mo., a corporation of Delaware Application March 15, 1945, Serial No. 582,842

6 Claims. (Cl. 309—45)

This invention relates generally to piston rings for internal combustion engines.

Piston rings as ordinarily constructed are given to fluttering, with the result that compression is lost in the case of a compression ring, or inefficient oil control results in the case of an oil ring. Such fluttering is particularly noticeable at high engine speeds.

The object of the present invention, generally stated, is to provide a piston ring in which the tendency to flutter at high engine speeds is substantially reduced.

Another object of the present invention is to provide a piston ring which twists in its groove, when compressed to cylinder size.

Figure 1:
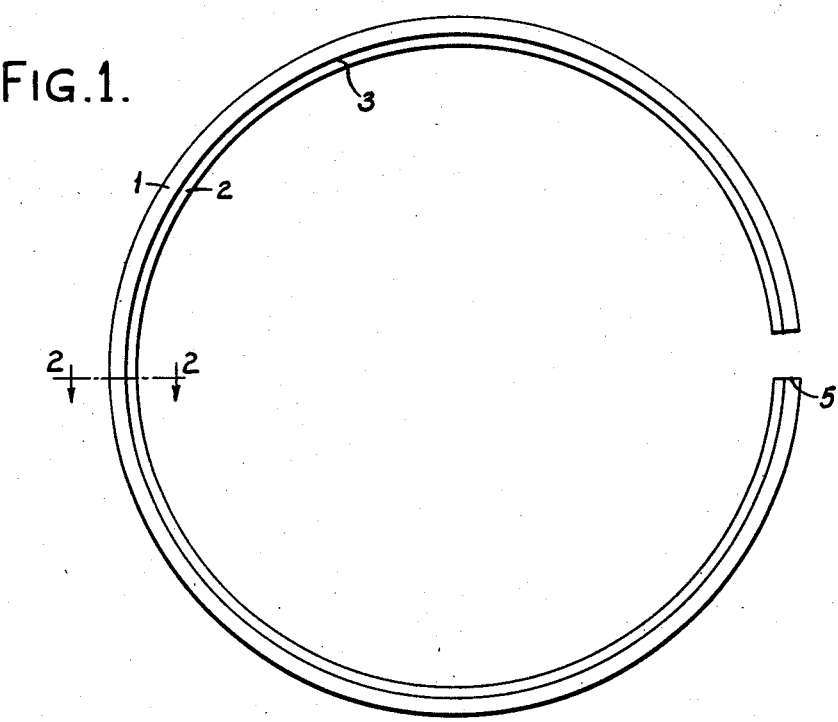
Figure 2:
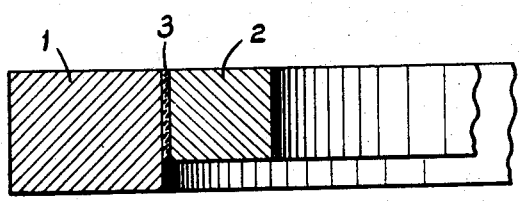

Other objects will become apparent to those skilled in the art when the following description is read in connection with the accompanying drawing, in which:

Figure 1 is a plan view of a piston ring constructed in accordance with the present invention in its free and unconfined condition; and Figure 2 is a sectional view taken along line 2—2 of Figure 1.

In accordance with the present invention, and in order to reduce the tendency of piston rings to flutter, it is contemplated that the ring be composed of an exterior lamina and an interior lamina, permanently connected as by welding, brazing, riveting or otherwise, at their contiguous axial surfaces. Preferably the respective laminae are formed of materials having different vibration characteristics, such for example as steel and cast iron, but, in order to effectively utilize the difference in vibration characteristics of the materials of the respective laminae for mutually neutralizing the tendency of the respective laminae to flutter, the present invention contemplates that the cross section of the respective laminae be substantially square, and preferably also that any difference between the radial and axial dimensions of the respective laminae be represented as an excess of radial dimension over the axial dimension.

The present invention further contemplates that when it is desired to provide a piston ring which will twist in its groove the cross sectional dimensions of the respective laminae be different, and arranged with respect to each other so that the inward-downward diagonal is longer or shorter than the inward-upward diagonal of the composite ring depending, respectively, upon whether it is desired that the ring should cock in the groove so as to bring its outer-lower corner or its outer-upper corner into engagement with the cylinder wall. For example, when it is desired to cock the ring in the groove so that its outer-lower corner be held in firm engagement with the cylinder wall, the interior lamina of the ring of the present invention will be formed with an axial dimension less than that of the exterior lamina, and will be connected to the exterior lamina so that the lower radial faces of the respective laminae are in alignment but the upper radial faces thereof offset one from the other. Comparable cocking may also be achieved by providing the lamina of lesser axial dimension on the exterior, and arranging the laminae so that their upper radial faces are in alignment and the offset at the lower inside corner. Conversely, if it should be desired to cock the ring in the groove so that the lower outside corner engages the cylinder wall, the lamina of smaller axial dimension may be arranged on the inside with its upper axial radial face in alignment with the upper radial face of the exterior lamina, or the lamina of smaller axial dimension may be arranged exteriorly with its lower radial face in alignment with the lower radial face of the other lamina.

When substantially square laminae are utilized but different in cross sectional area in the manner just described, the piston ring of the present invention has the two-fold advantage of substantial elimination of fluttering and substantially high unit pressures against the cylinder wall.

Referring now to the drawings for an illustrative embodiment of the present invention, the piston ring consists of two laminae 1 and 2 which are permanently connected together at their contiguous axial faces 3 by any suitable means, such for example as welding, brazing or riveting.

In the embodiment shown the laminae are respectively of different material, the outer lamina 1 being of cast iron and the inner lamina 2 being of steel which is elastically stiffer than cast iron, i. e., has a higher modulus of elasticity, each lamina, however, being approximately square. While in the embodiment shown the radial dimension of the lamina 1 is approximately 20% greater than the axial dimension thereof and the radial dimension of the lamina 2 is approximately 5% greater than the axial dimension thereof, the cross-sectional configuration of each lamina is sufficiently close to square to accomplish the desired anti-fluttering characteristic. The radial and axial dimensions of the individual laminae may, therefore, be expressed as a constant plus or minus 15%. By thus combining laminae of different materials having different degrees of elasticity and of a configuration to be radially stiff, each lamina is adapted to neutralize any tendency of the outer lamina to flutter.

In the embodiment illustrated the axial dimension of the lamina 1 is approximately 30% greater than the axial dimension of the lamina 2, such differential in axial dimension creating a tendency for the ring to twist in its groove when contracted to cylinder size. Such contraction is accomplished by providing a gap 5 in the composite ring so that when free the ring is slightly larger in diameter than the diameter of the cylinder in which it is to be used, but the ring may be contracted to cylinder size by virtue of the existence of the gap 5.

From the foregoing description those skilled in the art will understand the construction and advantages of the present invention. While one specific embodiment has been illustrated and described in detail, it is not to be understood that the invention is limited to the details of that embodiment but it is contemplated that many variations and alterations within the principle hereinbefore described may be made by those skilled in the art without departing from the spirit of this invention, as defined in the appended claims.

Having thus described the invention, what I claim is:

1. A piston ring comprising laminae of elastically different materials arranged one within the other and each being substantially rectangular in cross section, the adjoining peripheral surfaces of said laminae being permanently connected together throughout their length, and in axially offset relation, one of the laminae having a greater axial dimension than the other.

2. A piston ring comprising laminae of elastically different materials arranged one within the other and each being substantially square in cross section, the adjoining peripheral surfaces of said laminae being permanently connected together throughout their length, the outer one of said laminae having a greater axial dimension than the inner one, and said laminae being radially aligned at one side only of said ring.

3. A piston ring comprising laminae of elastically different materials arranged one within the other and each being substantially square in cross section, the axial dimension of said laminae not exceeding the radial dimension thereof respectively, the adjoining peripheral surfaces of said laminae being permanently connected together throughout their length and in axially offset relation, and one of the laminae having a greater axial dimension than the other.

4. A piston ring comprising laminae arranged one within the other and each being substantially square in cross section, the adjoining peripheral surfaces of said laminae being permanently connected together throughout their length and in axially offset relation, the outer lamina being of cast iron and the inner lamina having different vibration characteristics from the outer lamina.

5. A composite piston ring, comprising inner and outer laminae permanently connected together throughout their adjoining peripheries, said laminae each being substantially rectangular in cross-section with its radial dimension greater than its axial dimension and the axial dimension of one lamina being greater than that of the other, and said laminae being constructed of different materials having different elastic properties and being axially offset relative to each other.

6. A composite piston ring, comprising inner and outer laminae permanently connected together throughout their adjoining peripheries, said laminae each being substantially rectangular in cross-section with its radial dimension greater than its axial dimension but by not more than 20%, said inner lamina having a smaller axial dimension than said outer lamina and having one of its radial faces flush with a radial face of the latter, and said laminae being constructed of different materials having different elastic properties.

DANIEL A. ROSS.

REFERENCES CITED

The following references are of record in the file of this patent:

UNITED STATES PATENTS

| Number | Name | Date |
|---|---|---|
| 1,260,009 | Miles | Mar. 19, 1918 |
| 1,919,183 | Paton | July 18, 1933 |
| 2,068,042 | Teetor | Jan. 19, 1937 |

FOREIGN PATENTS

| Number | Country | Date |
|---|---|---|
| 480,860 | Great Britain | Mar. 1, 1938 |
| 99,174 | Sweden | June 18, 1940 |

Certificate of Correction

Patent No. 2,503,133 April 4, 1950

DANIEL A. ROSS

It is hereby certified that errors appear in the printed specification of the above numbered patent requiring correction as follows:

Column 3, line 4, for the word "outer" read *other*; line 37, strike out the comma after "length";

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*